US00RE44195E

(19) United States
(12) Reissued Patent
Belliveau et al.

(10) Patent Number: US RE44,195 E
(45) Date of Reissued Patent: May 7, 2013

(54) THEATRE LIGHT APPARATUS INCORPORATING LED TRACKING SYSTEM

(75) Inventors: Richard S. Belliveau, Austin, TX (US); Michael Bell, Austin, TX (US); David Dahly, Austin, TX (US); David Karl Peck, Austin, TX (US)

(73) Assignee: Barco Lighting Systems, Inc., Austin, TX (US)

(21) Appl. No.: 13/070,546

(22) Filed: Mar. 24, 2011

Related U.S. Patent Documents

Reissue of:
(64) Patent No.: 7,543,955
Issued: Jun. 9, 2009
Appl. No.: 11/710,735
Filed: Feb. 26, 2007

U.S. Applications:
(63) Continuation of application No. 11/516,822, filed on Sep. 7, 2006, now Pat. No. 7,600,891.

(51) Int. Cl.
*F21V 9/00* (2006.01)

(52) U.S. Cl.
USPC ..... 362/231; 362/8; 362/11; 362/16; 362/18; 362/233

(58) Field of Classification Search ..... 362/231, 362/8, 11, 16, 18, 233, 800
See application file for complete search history.

(56) References Cited

U.S. PATENT DOCUMENTS

| | | | | |
|---|---|---|---|---|
| 4,392,182 | A | 7/1983 | Di Matteo | 362/5 |
| 4,392,187 | A | 7/1983 | Bornhorst | 362/233 |
| 4,914,556 | A | 4/1990 | Richardson | 362/293 |
| 4,958,265 | A | 9/1990 | Solomon | 362/293 |
| 4,984,143 | A | 1/1991 | Richardson | 362/293 |
| 5,031,078 | A | 7/1991 | Bornhorst | 362/32 |
| 5,353,211 | A | 10/1994 | Merko | 362/294 |
| 5,402,326 | A | 3/1995 | Belliveau | 362/284 |
| 5,515,254 | A | 5/1996 | Smith | 362/293 |
| 5,544,029 | A | 8/1996 | Cunningham | 362/271 |
| 5,580,164 | A | 12/1996 | Maddox | 362/293 |
| 5,665,305 | A * | 9/1997 | Belliveau et al. | 362/268 |
| 5,774,273 | A | 6/1998 | Bornhorst | 359/665 |
| 6,046,861 | A | 4/2000 | Steele | 359/688 |
| 6,357,893 | B1 * | 3/2002 | Belliveau | 362/285 |
| 6,687,063 | B1 | 2/2004 | Rasmussen | 359/887 |
| 6,693,392 | B2 * | 2/2004 | Belliveau | 315/200 A |
| 6,710,941 | B2 * | 3/2004 | Hennen et al. | 359/742 |
| 6,796,683 | B2 | 9/2004 | Wood | 362/281 |
| 6,812,653 | B2 * | 11/2004 | Belliveau | 315/318 |
| 6,909,123 | B2 | 6/2005 | Hayashimoto et al. | 257/98 |

(Continued)

OTHER PUBLICATIONS

"Any Color Any Time", Lighting Dimensions, Aug. 2004.

(Continued)

*Primary Examiner* — Jong-Suk (James) Lee
*Assistant Examiner* — Mark Tsidulko
(74) *Attorney, Agent, or Firm* — Walter J. Tencza, Jr.

(57) ABSTRACT

A multiparameter light is disclosed, which incorporates an LED (light emitting diode) tracking ring surrounding a main output lens. The LED tracking ring is capable of additive color mixing and in turn can simulate the color of the main projected light projecting from the main output aperture or output lens of the multiparameter light.

11 Claims, 5 Drawing Sheets

U.S. PATENT DOCUMENTS

| | | | | |
|---|---|---|---|---|
| 7,163,317 | B2 * | 1/2007 | Warnecke et al. | 362/281 |
| 7,293,893 | B2 | 11/2007 | Kim | 362/205 |
| 2002/0075685 | A1 | 6/2002 | Rasmussen | 362/282 |
| 2006/0119795 | A1 | 6/2006 | Lippey | 353/20 |

OTHER PUBLICATIONS

Product:: High Ground, Company: Novalight, http://www.novalight.it/caratteristiche/HG MY car.pdf, Novalight located in Viterbo Italy.

Product:: Easy Color, Company:Aryton, http://www.ayrton-liqht.com/down_productspecif/easycol2 _specif_uk.pdf, Aryton located in Longjumeau, France.

"The High End Systems Product Line 2001" and are available from High End Systems, Inc. of Austin, Texas.

Product: Source Four 5 degree, Company: Electronic Theatre Controls, Inc., PDF: http://www.etcconnect.com/docs/docs_downloads/datashts/S405_vE.pdf, Electronic Theatre Controls located in Middleton Wisconsin.

http://www.novalight_it/caratteristiche/HG_MY_car_pdf; Company: Novalight; Product: High Ground.

http://www.ayrton-light.com/down_productspecif/easycol?_specif_uk_pdf; Company: Ayrton; Product: Easy Color.

"High End Systems Lighting—World—Wide 2000", High End systems, Inc. of Austin, Texas; Product Line borchure 2000.

http://www.etconnect.com/docs/docs_downloads/datashts/S4_05_vF_pdf; Company: Electronic Theatre Controls, Inc.; Product: Source Four 5 degree.

* cited by examiner

THEATRE LIGHT APPARATUS INCORPORATING LED TRACKING SYSTEM

Matter enclosed in heavy brackets [ ] appears in the original patent but forms no part of this reissue specification; matter printed in italics indicates the additions made by reissue.

CROSS REFERENCE TO RELATED APPLICATION(S)

The present application is a continuation of and claims the priority of U.S. patent application Ser. No. 11/516,822, titled "THEATRE LIGHT APPARATUS INCORPORATING LED TRACKING SYSTEM", filed on Sep. 7, 2006 *now U.S. Pat. No. 7,600,891*.

FIELD OF THE INVENTION

This invention relates to multiparameter lighting fixtures.

BACKGROUND OF THE INVENTION

Multiparameter lighting fixtures are lighting fixtures, which illustratively have two or more individually remotely adjustable parameters such as focus, color, image, position, or other light characteristics. Multiparameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks. Illustrative multi-parameter lighting fixtures are described in the product brochure showing the High End Systems product line for the year 2000 and are available from High End Systems, Inc. of Austin, Tex.

Multiparameter lighting fixtures are commonly constructed with a lamp housing that may pan and tilt in relation to a base housing so that light projected from the lamp housing can be remotely positioned to project on the stage surface. Commonly a plurality of multiparameter lights are controlled by an operator from a central controller. The central controller is connected to communicate with the plurality of multiparameter lights via a communication system. U.S. Pat. No. 4,392,182 titled "Computer controlled lighting system having automatically variable position, color, intensity and beam divergence" to Bornhorst and incorporated herein by reference, disclosed a plurality of multiparameter lights and a central controller.

The lamp housing of the multiparameter light contains the optical components and the lamp. The lamp housing is rotatably mounted to a yoke that provides for a tilting action of the lamp housing in relation to the yoke. The lamp housing is tilted in relation to the yoke by a motor actuator system that provides remote control of the tilting action by the central controller. The yoke is rotatably connected to the base housing that provides for a panning action of the yoke in relation to the base housing. The yoke is panned in relation to the base housing by a motor actuator system that provides remote control of the panning action by the central controller.

It is desirable for a multiparameter light to have a large light output aperture to create a large beam of light cross section. This often causes a problem because the final output lens that often establishes the output aperture of a multiparameter light must be large in diameter. When the output lens diameter exceeds eight inches the glass lens can become quite heavy. The increased weight of the lens requires a more expensive support frame and larger motors to drive the increased weight of the lamp housing.

SUMMARY OF THE INVENTION

A novel high power multiparameter light apparatus is disclosed. The multiparameter light of one or more embodiments of the present invention incorporates an LED (light emitting diode) tracking ring surrounding a main output lens. The LED tracking ring is capable of additive color mixing and in turn can simulate the color of the main projected light projecting from the main output aperture or output lens of the multiparameter light.

DETAILED DESCRIPTION OF THE DRAWINGS

Figure 1:
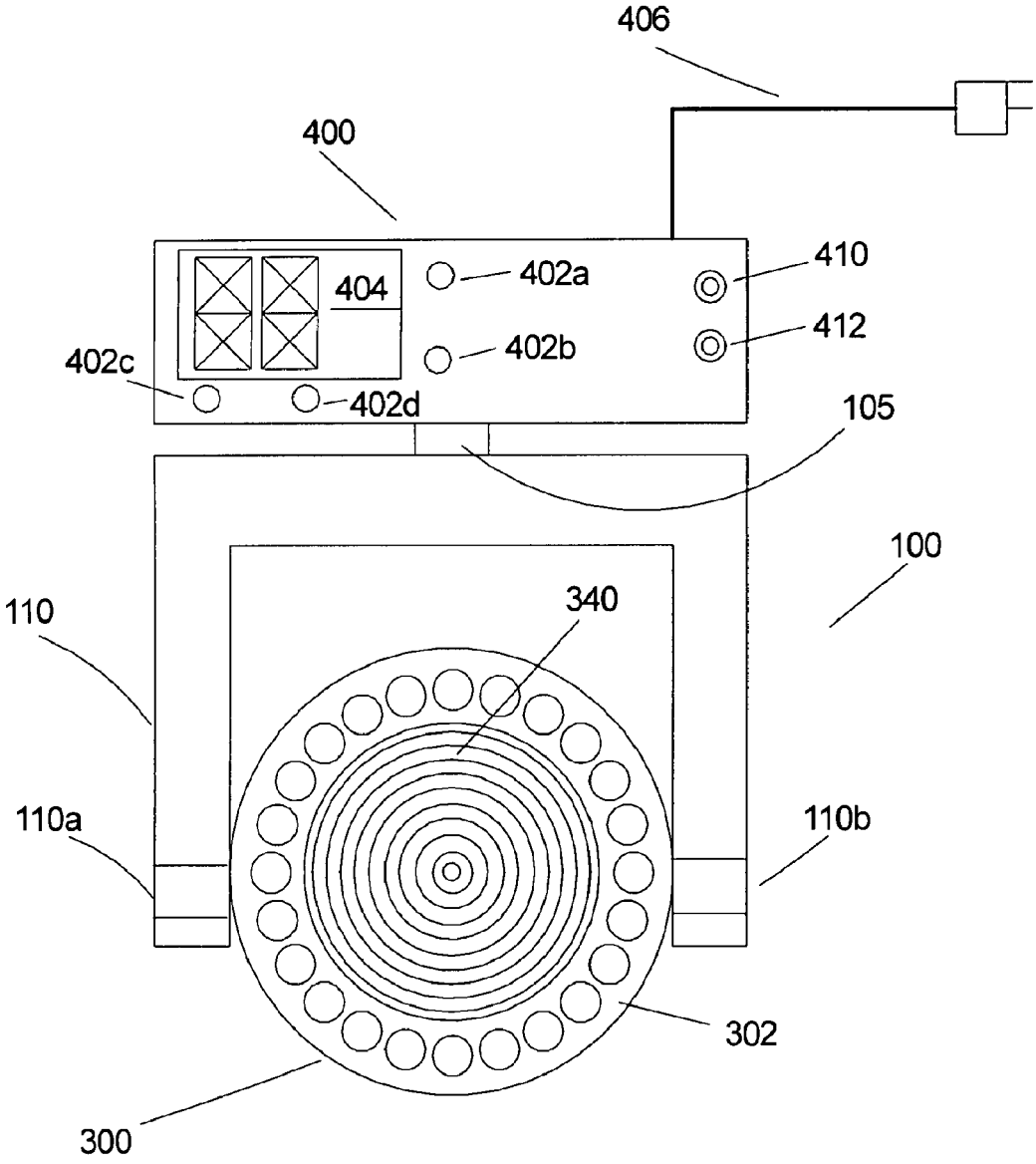
FIG. 1 shows a multiparameter light in accordance with an embodiment of the present invention.

In the description that follows, like parts are marked throughout the specification and drawings with the same reference numerals, respectively. The drawing figures are not necessarily to scale. Certain features of embodiments of the present invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

In particular, various embodiments of the present invention provide a number of different methods and apparatus for operating and controlling multiple IPLD lighting systems. The concepts of the invention are discussed in the context of IPLD lighting systems but the use of the concepts of the present invention is not limited to IPLD systems and may find application in other lighting and other visual systems where control of the system is maintained from a remote location and to which the concepts of the current invention may be applied.

FIG. 1 shows a multiparameter light 100 in accordance with an embodiment of the present invention. The multiparameter light 100 includes a lamp housing 300 and a base housing 400. The multiparameter light 100 is capable of remotely panning and tilting the lamp housing 300 in relation to the base housing 400. The lamp housing 300 is mounted by bearing assemblies 110a and 110b so that the lamp housing 300 can tilt in relation to a yoke 110. The yoke 110 can pan in relation to the base housing 400 by means of a bearing 105. The lamp housing 300 is remotely tilted in relation to the base housing 400 by a first motor actuator not shown for simplicity. The yoke 110 is remotely panned in relation to the base housing 400 by a second motor actuator not shown for simplicity.

The lamp housing 300 includes, or has located therein, an output lens 340. The output lens 340 may be a polymer fresnel lens and typically is the main output lens of the lamp housing 300. A polymer fresnel lens is used in accordance with an embodiment of the present invention for output lens 340 to reduce the weight associated with glass fresnel lenses of the prior art. The output lens 340 includes an output aperture 340a shown in FIG. 2A. Also shown is a plurality of LEDs that are used for form an LED tracking ring 302. Glass fresnel lenses are used in the prior art for non-imaging applications and therefore are used in wash lights that do not project a pattern (referred to as gobo in the art). In accordance with one or more embodiments of the present invention, it has been found that with the use of a close tolerance polymer fresnel lens for output lens 340, patterns formed by gobos placed into a light path by a gobo wheel can be projected by an automated theatre light of one or more embodiments of the present invention without too much distortion caused by any abnormalities of the output lens 340. Generally, the use of a gobo wheel comprising gobo patterns that can be indexed into a light path for projection by an automated theatrical light is known in the art and is disclosed in U.S. Pat. No. 5,402,326 titled "Gobo Holder for a Lighting System", inventor Richard Belliveau (co-inventor on present application). Most high tolerance polymer fresnel lenses are constructed of acrylic however it has been found that the use of a polycarbonate fresnel lens can be used to accommodate the elevated temperatures found in high performance theatrical lights The base housing 400 has a graphical display 404 and input keys 402a, 402b, 402c and 402d used for setting a communications address as well as controlling other functions of the multiparameter light 100. The multiparameter light also includes a power input cord 406 for connecting the multiparameter light 100 to a source of power.

Figure 2A:
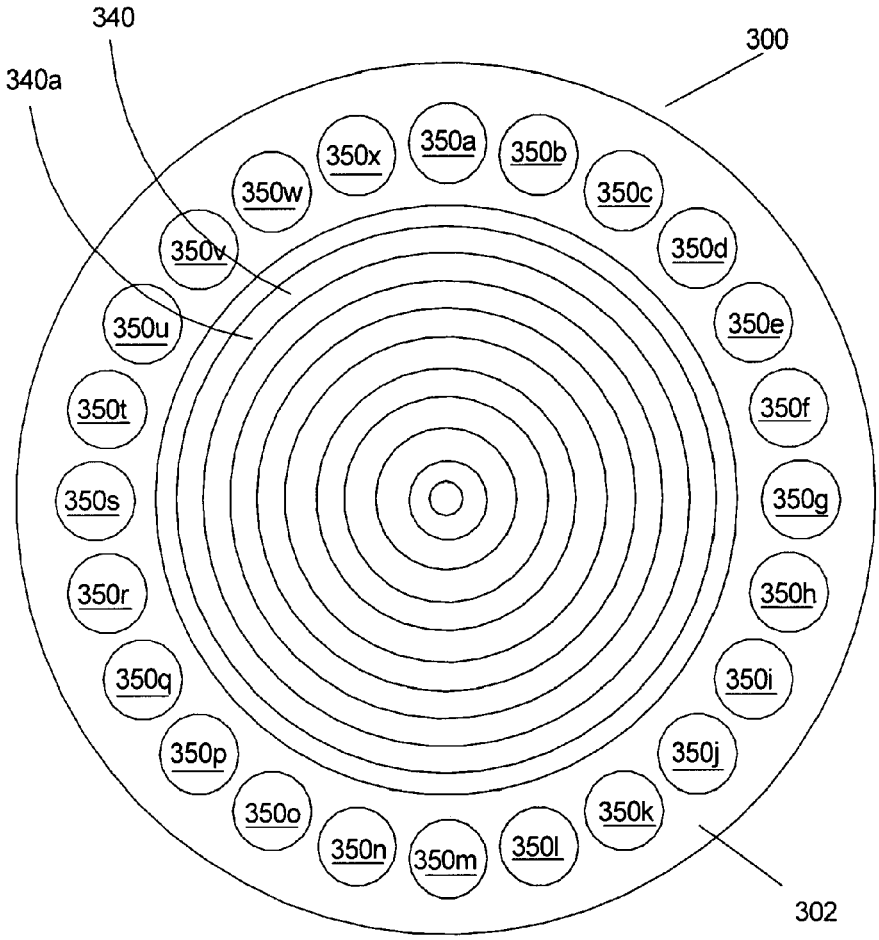
FIG. 2A shows a fresnel lens and an LED tracking ring incorporated into the multiparameter light of FIG. 1.

FIG. 2A shows a more detailed drawing of a possible embodiment for the lamp housing 300. The LED tracking ring 302 is shown constructed of a circular array of LEDs shown as LEDs 350a through 350x that are located along the perimeter of the output lens 340 in a ring like fashion.

Figure 3:
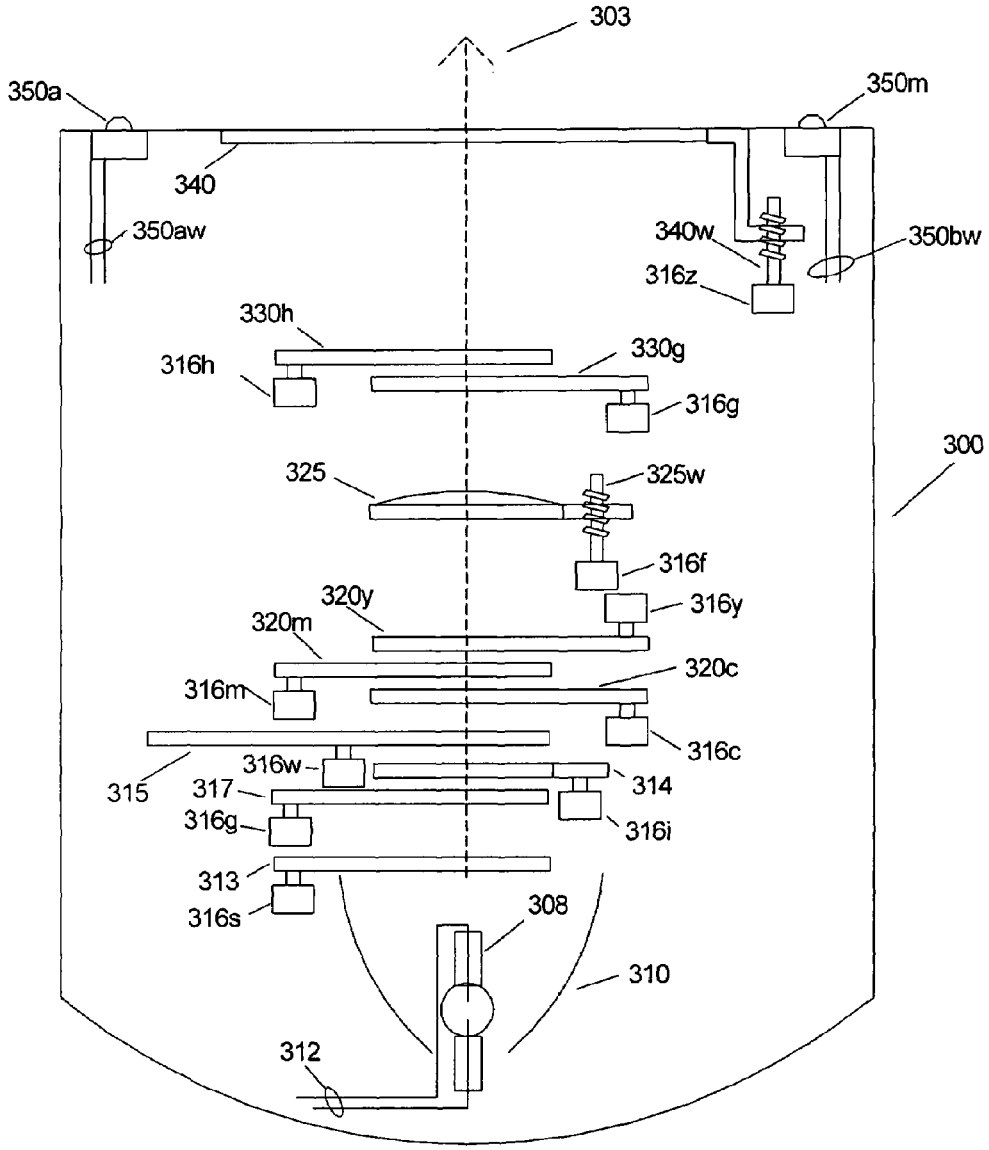
FIG. 3 shows an internal view of components of a lamp housing of the multiparameter light of FIG. 1.

FIG. 3 shows an internal look at components of the lamp housing 300 of the multiparameter light 100 in accordance with an embodiment of the present invention. The lamp housing 300 includes, or has located therein, a central lamp 308. The central lamp 308 may be a metal halide, mercury, xenon, halogen, LED or other light source. The central lamp 308 has power wires 312 connected thereto. The central lamp 308 is contained within a reflector 310 that reflects light emitted by the central lamp 308 forward along a light pathway 303 shown by a dashed line. The lamp housing 300 includes, or has located therein, a strobe shutter 313, which is driven by a motor actuator 316s. A gobo wheel 317 is shown and various gobos placed upon the gobo wheel can be driven into the light path or light pathway 303 by motor actuator 316g to be focused by a focusing lens 325 driven by a motor actuator 316g. The lamp housing 300 further includes, or has located therein, a variable iris 314. The variable iris 314 is remotely varied in the light path 303 by a motor actuator 316i. The lamp housing 300 further includes, or has located therein, a color filter wheel 315, which may contain several different colors that can be varied in the light path 303. The color filter wheel 315 is driven by a motor actuator 316w.

The lamp housing 300 may further include, or have located therein, a subtractive color system using Cyan, Magenta and Yellow (referred to as CMY). The subtractive color system may be used to variably modify the colors of the projected light from central lamp 308. The subtractive color system may be constructed of dichroic color filter media that is fashioned into color filter flags 320c, 320m and 320y that are serially positioned in the light path 303 and can be varied across the light path 303 by motors. The color filter flags 320c, 320m, and 320y, may be cyan, magenta, and yellow color filter flags, respectively. The cyan color filter flag 320c is varied in the light path 303 by a motor actuator 316c. The magenta color filter flag 320m is varied in the light path 303 by a motor actuator 316m. The yellow color filter flag 320y is varied in the light path 303 by a motor actuator 316y. The color filter wheel 315 acts as a color varying system to vary the color of the light emitted by the output lens 340. The system of CMY (cyan, magenta, and yellow) color filters acts as a color varying system to vary the color of the light emitted by the output lens 340.

The focus lens 325 of FIG. 3 is shown varied in the light path 303 by a lead screw system 325w by motor actuator 316f. A first flag 330g is used to vary optical power and is varied in the light path 303 by a motor actuator 316g. A second flag 330h is used to vary optical power and is varied in the light path 303 by a motor actuator 316h. The first and second flags 330g and 330h, respectively, can be constructed of arrays of lenticular lenses, radial lenses or even clear art glass patterned with raised areas that can provide a power of magnification. The optical power varying flags are used to convert the projected output of the output lens 340 from a hard edge (imaging application) to a soft edge (non-imaging application). When the optical power varying flags 330g and 330h are inserted fully into the light path 303, gobo images from the gobo wheel 317 are not focusable and the automated theatre light or multiparameter light 100 converts from a hard edge to a soft edge light output from output lens 340

The output lens 340 is a fresnel lens constructed of a polymer. The polymer material may be clear acrylic or polycarbonate. The output lens 340 is varied in the optical path or light pathway 303 by lead screw system 340w driven by motor actuator 316z. The output lens 340 may work in conjunction with the focus lens 325 to operate as a zoom and focus lens system.

An LED (light emitting diode) 350a is shown along with the simplified wiring connection points 350aw. A second LED (light emitting diode) 350m is shown along with simplified connection points 350bw. The connection points 350aw and 350bw connect to the LED control 442 of FIG. 4 but are not shown connected for simplification. The LEDs 350a and 350m of FIG. 3 are the same as LEDs 350a and 350m of FIG. 2A. In the drawing of the lamp housing 300 of FIG. 3 only two of the LEDs that make up the LED tracking ring 302 of FIG. 2A are shown for simplicity.

Figure 4:
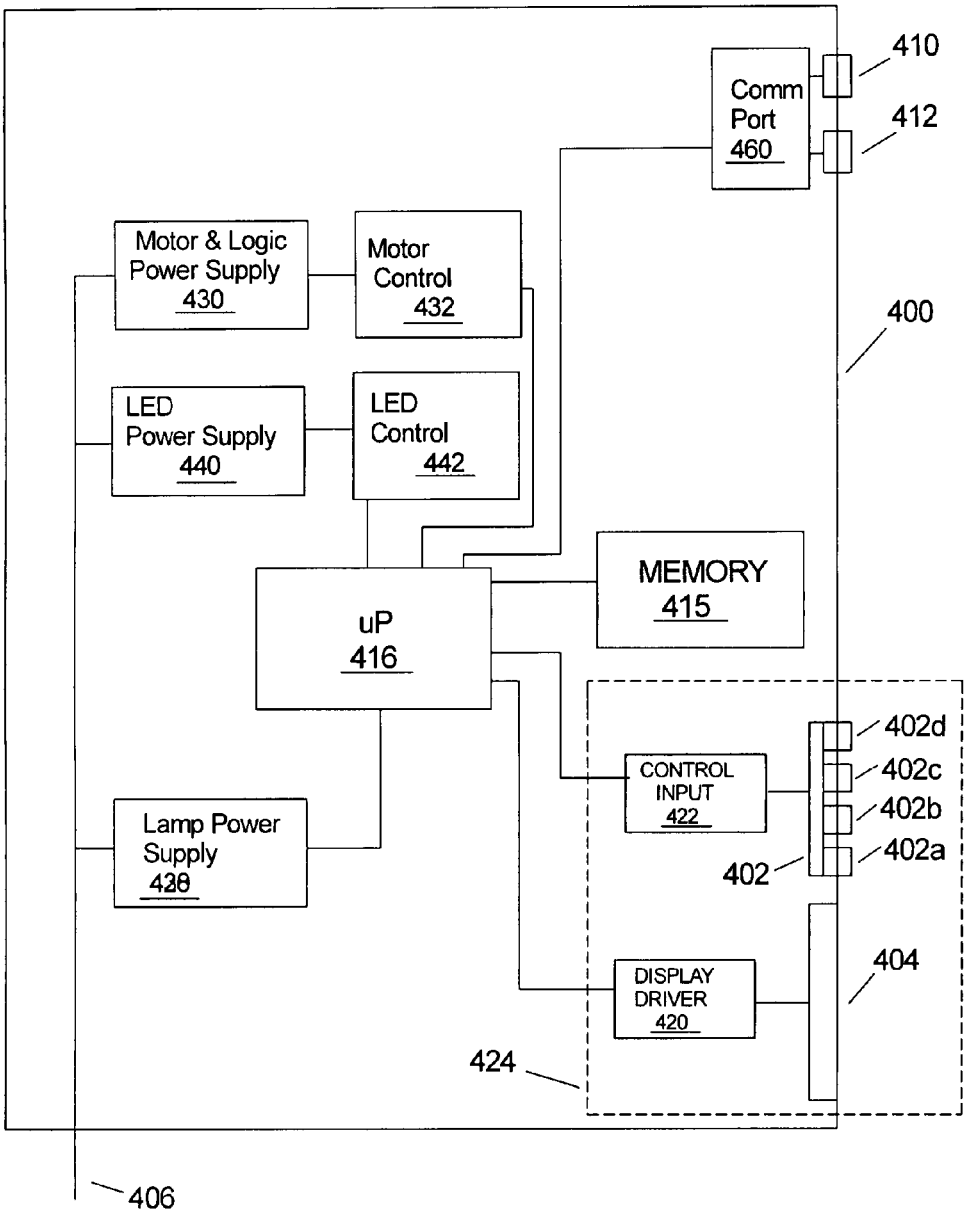
FIG. 4 shows an internal view of the components of the base housing of the multiparameter light of FIGS. 1.

FIG. 4 shows components in the base housing 400 of FIG. 1. A power input cord 406 is shown for providing a means of supplying operating power. Two communication input connectors 410 and 412 are shown connected to a communications port 460. The communications port 460 may be constructed of an industry standard RS422 or RS485 driver system as known in the art. The communications port 460 forwards control information to a processor 416. The processor 416 may be a single processor or a plurality of processors working together. The processor 416 working in conjunction with operational code stored in a memory 415 receives commands from a central control system such as a central controller 510 shown in FIG. 5. The processor 416 may send instructions to a motor actuator control 432 to vary the state of motors 316s, 316i, 316w, 316c, 316m, 316y, 316f, 316g, 316h, and 316z (wiring connections not shown for simplification). The motors shown are preferably stepping type motor actuators but many other types of actuators known in the art could be used.

The motor control 432 also can vary the pan and tilt motors, not shown for simplification, that cause the lamp housing 300 to tilt in relation to the yoke 110 and the yoke 110 to pan in relation to the base housing 400. The base housing 400 also includes or may have located therein, a motor and logic power supply 430, which may supply the necessary power to operate all of the motors and the logic circuitry included or inside the base housing 400.

The processor 416 may operate to send control signals to a lamp power supply 428 which remotely enable and power the central lamp 308. The processor 416 may send control signals to an LED control 442 that is connected (wiring not shown for simplification) to the plurality of LEDs 350a through 350x that comprise the LED tracking ring 302 of FIG. 1. The LED control 442 provides three separate control signals that include a first control signal for the simultaneous control of all of the red LEDs, a second control signal for the simultaneous control of all of the green LEDs and a third control signal for simultaneous control of all of the blue LEDs that make up the LEDs 350a through 350x. Alternatively the LED control 442 may provide a separate control signal for each red, blue and green component of each of the LEDs 350a through 350x. The LED power supply 440 may supply the necessary power to operate the LEDs 350a through 350x that are provided their driving signals by the LED control 442. The LEDs 350a though 350x emit variably colored light that can color match the color of the light projected by the output lens 340 through the output aperture 340a shown in FIG. 2A.

External input buttons switches 402a, 402b, 402c, and 402d may be mounted to a circuit board 402 which may be or may be part of a means for external input commands. The action of switches 402a, 402b, 402c, and 402d are read by a control input 422 and sent to the processor 416 as external input commands. A display device 404, which may be a dot matrix or other graphical display, is used to provide feedback to an operator. The display device 404 is driven by a display driver 420 that receives commands from the processor 416 to alter display characters of the display device 404. The switches 402a, 402b, 402c and 402d, circuit board 402, control input 422, display device 404 and the display driver 420 are components of a stand alone control system 424 shown by the dashed lines.

Figure 5:
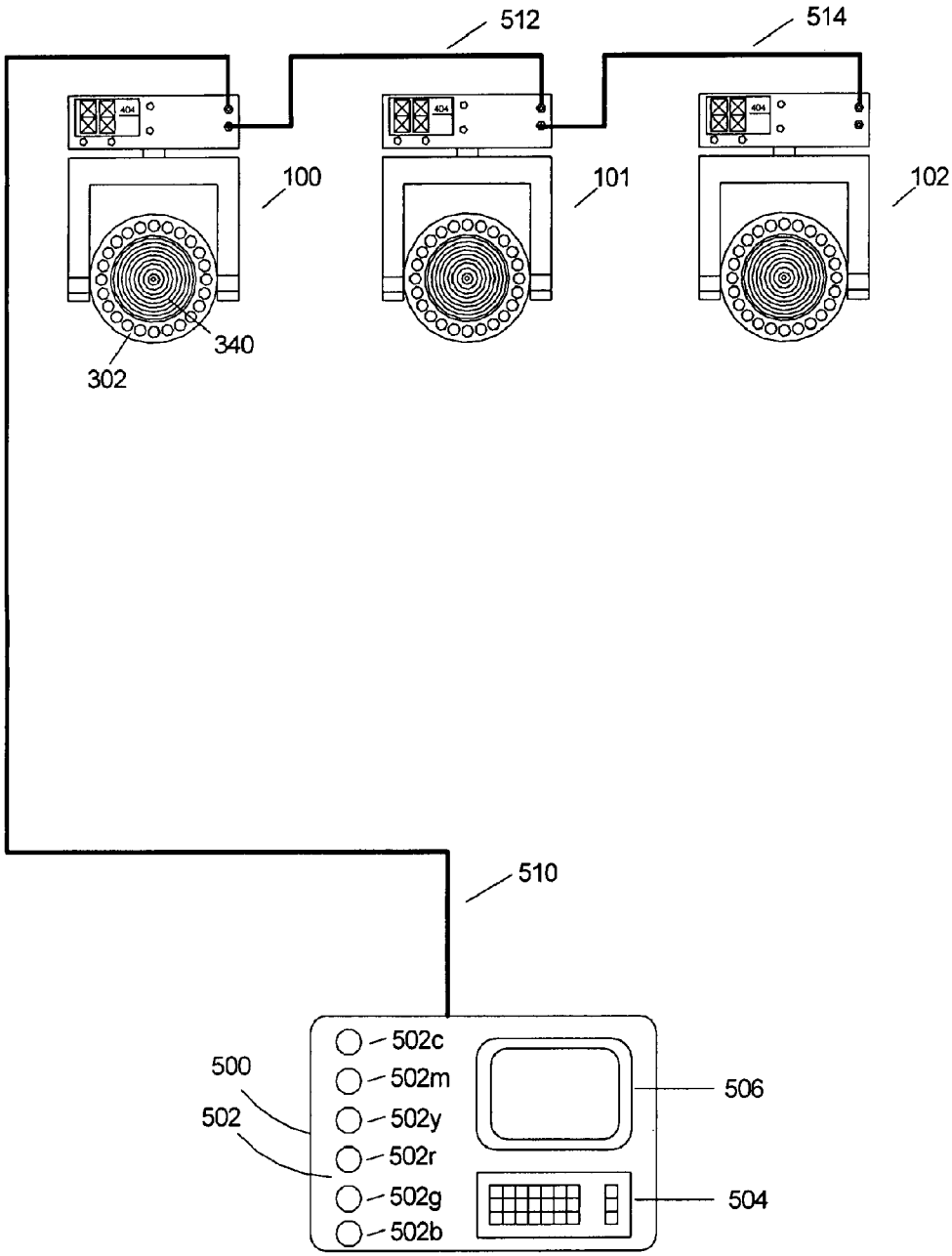
FIG. 5 shows a lighting system comprised or a plurality of multiparameter lights in accordance with an embodiment of the present invention connected for communication to a central controller.

FIG. 5 shows three multiparameter lights or multiparameter theatre lights 100, 101 and 102 in accordance with an embodiment of the present invention connected by communications wires 510, 512 and 514 to a central controller 500. The central controller 500 can communicate commands to the multiparameter theatre lights 100, 101 and 102 using the DMX protocol standard developed by the United States Institute for Theatre Technology of Syracuse, N.Y., which is commonly used for communication between theatrical devices. The central controller 500 has a display device 506, input devices 502 and a keyboard 504. The input devices 502 include input devices 502c, 502m, 502y, 502r, 502g, and 502b. The input devices 502 and the keyboard 504 may be any type of input devices including potentiometers, encoders or a touch screen that is placed over the display device 506 An operator of the central controller may remotely operate the lights 100, 101 and 102 by inputting to the input devices 502c, 502m, 502y, 502r, 502g, 502b and the keyboard 504. The display device 506 may also be a touch screen display device and as such may also accept input commands from an operator. The central controller 500 may be equipped to vary the color and intensity of the LED tracking ring 302 of FIG. 2A as well as the color and intensity of the light projected from the output lens 340. The light projected by the output lens 340 and through output aperture 340a can also be referred to as the main output light. It is preferred that the output lens 340 be both the output lens and output aperture 340a, but is it also possible for the output aperture to be separate from the lens such as when using a clear window placed after the lens. Although only three automated theatre lights 100, 101 and 102 of an embodiment of the present invention are shown in FIG. 5, many more theatre lights in accordance with one or more embodiments of the invention may be controlled by the central controller 500.

Figure 2B:
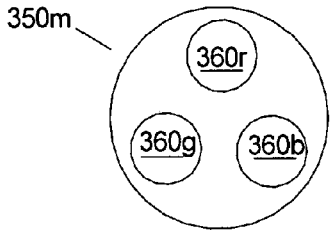
FIG. 2B shows an LED from the color tracking ring of FIG. 2A comprised of a plurality of separate colored LEDs.
Figure 2C:
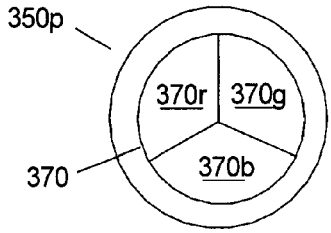
FIG. 2C shows an LED from the color tracking ring of FIG. 2A comprised of a single RGB (red, green, and blue) LED.

The LEDs in the color tracking ring 350a through 350x of FIG. 2A may each be comprised of a plurality of Red, Green and Blue separate LEDs. FIG. 2B shows LED 350m of FIG. 2A comprised of separate LEDs 360r, 360g, and 360b. Separate LED 360r represents a separate red LED, separate LED 360g represents a separate green LED, and separate LED 360b represents a separate blue LED. FIG. 2C shows LED 350p of FIG. 2A comprised of a single LED that has been manufactured to incorporate three LED dies 370r, 370g, and 370b into a single output aperture 370. It is preferred that the LED tracking ring 302 be comprised of LEDs 350a through 350x, each of which have been manufactured to incorporate the red, green and blue LED dies into a single output aperture like the RGB LED shown in FIG. 2C. The single package red, green and blue (RGB) provides a better homogenous color blend to the eye when looking at the system operate.

The multiparameter theatre light 100 can operate to project light (main output light) originating from the central lamp 308 and passing through the output lens 340 and output lens aperture 340a. The motors 316c, 316m and 316y can be used to vary the color filter flags 320c, 320m and 320y into the light pathway 303. Varying the color filter flags 320c, 320m and 320y varies the saturation of the cyan, magenta and yellow color, respectively, applied to light in the light pathway 303. Varying the color of the projected light from a multiparameter theatre light, by using cyan, magenta and yellow filters is well known in the art. This practice is referred to as CMY (cyan, magenta and yellow) color mixing. CMY is also referred to in the art as "subtractive color mixing". A product called "Cyberlight" (trademarked) manufactured by High End Systems and described in the "The High End Systems Product Line 2001" brochure makes use of a CMY system to vary the color of the projected light.

The multiparameter theatre light 100 of FIG. 5 is typically remotely controlled by an operator of the central controller 500. The operator first selects which of the plurality of multiparameter theatre lights 100, 101 and 102 the operator wishes to control by inputting an address into the keyboard 504. If the operator enters the address of light 100 the operator may next vary the CMY saturation of the main output remotely by adjusting input devices 502c for cyan, 502m for magenta, and 502y for yellow. The color varying control commands created by the operator with the control system 500 are sent over the communication wire 510 and received by the communications port 460 of FIG. 4. The communications port 460 passes the commands to the processor 416. The processor 416 acts on the color varying commands in accordance with the operating software stored in the memory 415 and sends the appropriate control signals to the motor control system 432. The motor control system 432 sends driving signals to the motors 316c, 316m and 316y to vary the CMY color flags 320c, 320m, and 320y, respectively, into the light path 303 to the desired color variation specified by the operator of the control system 500.

The operator may individually adjust cyan, magenta or yellow to achieve a mixed color in the visible spectrum.

The multiparameter theatre light 100 of FIG. 5 may also have the LED tracking ring color (i.e. produced by LEDs 350a-x) varied by an operator of the central controller 500 in a similar manner to the CMY control used for varying the color of the main output (i.e. produced from lamp 308 through aperture 340a of lens 340). After selecting the multiparameter theatre light 100, for example, the operator can adjust the input devices 502r, 502g and 502b. In response to the adjustment of the input devices 502r, 502g and 502b, the tracking ring color varying commands are created by the central controller 500 and are sent over communications wire 510 to the light 100. The light 100 receives the tracking ring color varying commands at the communications port 460 and sends the received commands to the processor 416. The processor 416 acts on these commands in accordance with the operating software stored in the memory 415 and sends the appropriate control signals to the LED control 442. The LED control 442 sends driving signals to the LEDs 350a though 350x to control the LEDs intensity to vary the color emitted by the LEDs to that specified by the operator of the central controller 500.

When the operator adjusts the input device 502r of FIG. 5 the intensity of the red part, section, or separate LED of all of the LEDs 350a though 350x of FIG. 2A are simultaneously adjusted. When the operator adjusts the input device 502b of FIG. 5 the intensity of the blue part, section or separate LED of all of the LEDs 350a though 350x of FIG. 2A are simultaneously adjusted. When the operator adjusts the input device 502g of FIG. 5 the intensity of the green part, section or separate LED of all of the LEDs 350a though 350x of FIG. 2A are simultaneously adjusted. This allows the operator to control the intensity of the red, green and blue LEDs that make up the LEDS 350a though 350x of FIG. 2A. Controlling the intensity of the red, green and blue LEDs that comprise LEDs 350s through 350x provides for an additive color mixing or RGB mixing of the color tracking ring 302. The term additive color mixing (or RGB color mixing) is well defined in the art. An additive color mixing system combines the primary colors of red, green and blue sources of light (RGB) to produce the secondary colors of cyan, magenta, and yellow (CMY). Combining all three primary colors in equally perceived intensities can produce white. Varying the intensities of the red, green and blue results in producing a wide variation of color. The RGB color mixing allows the color tracking ring 302 to vary color within the visible spectrum in a different way than CMY color mixing that is accomplished by varying the color mixing flags 320c, 320m and 320y into the light path 303 of the projected light that is created by the central lamp 308 and the projected light created by the lamp 308 and projected by through the lens aperture 340a is referred to as the main output. The operator can use the LED tracking ring 302 to match a visible color of the main output project light. This produces a pleasing effect where the color of the main output projected light is color matched or tracked by the light created by the LED tracking ring 302.

In practice the multiparameter theatre lights 100, 101 and 102 of FIG. 5 may each have a blue light projected as a main output projected light from the lens aperture 340a of FIG. 3 using CMY color mixing and the color tracking ring 302 may be color matched to the blue color of the main output projected light. Alternatively a pleasing complementary color may be created by the color tracking ring 302 in relation to the color of the main output projected light. If the colored light projected by the main output is blue then the color tracking ring 302 may be adjusted by an operator of the central control system 500 using the input controls 502r, 502b and 502y to produce a yellow light by varying the RGB LEDs 350a though 350x. The color of the main output projected light can be matched to the color tracking ring 302 by an operator of the central control system 500 of FIG. 5. Alternatively a complementary color can be created.

The multiparameter theatre light 100 of FIG. 1 can also create a strobing effect of the main output projected light projected through the lens 340 and the aperture 340a of FIG. 1. This is accomplished when an operator of the control system 500 of FIG. 5 selects one of the multiparameter theatre lights 100, 101 or 102 by inputting the correct address of the desired light the operator wishes to remotely control. If the operator has selected light 100 then the operator may adjust a strobe rate by inputting to the keypad 504. The rate can be a variable strobe rate but most strobe rates are variable between one Hz to twenty Hz. Upon receiving the main output strobe commands generated by the central controller 500 and sent over the communication wire 510 the light 100 receives the strobe commands at the communications port 460 and sends the received commands to the processor 416. The processor 416 acts on the main output strobe commands in accordance with the operating software stored in the memory 415 and sends the appropriate control signals to the motor control system 432. The motor control system 432 sends driving signals to the motor 316s to drive the strobe shutter 313 into and out of the light path 303 at the desired control rate specified by the operator of the control system 500. The use of a strobe shutter in a light path of a multiparameter light, in a general sense, is known in the theatre art.

The operator of the control system 500 of FIG. 5 may also wish to control the LED tracking ring 302 to strobe the intensity of the light emitted by the LEDs 350a thought 350x. The operator of the control system 500 after selecting one or more of the plurality of multiparameter theatre lights 100, 101 and 102 of FIG. 5 may enter an input with the input keyboard 504 to enter a strobe rate for the LED tracking ring 302. In this example the operator has selected the light 100 and wishes to control the strobe rate of the LED tracking ring 302 to create a new dynamic effect. The central controller 500 of FIG. 5 sends the LED tracking ring strobe commands to the multiparameter theatre light 100 over communications wire 510. Upon receiving the LED tracking ring strobe commands generated by the central controller 500 the light 100 receives the LED tracking strobe commands at the communications port 460 and sends the received commands to the processor 416. The processor 416 acts on these commands in accordance with the operating software stored in the memory 415 and sends the appropriate control signals to the LED control 442. The LED control 442 sends driving signals to the LEDs 350a though 350x to control the LEDs intensity at a rate used to create the required strobe rate. The strobe rate of the LED tracking ring 302 may be synchronous and in phase with the strobe rate of the main output projected light projected through the output lens 340 and through the aperture 340a or the strobe rate be different. Alternatively, the operator of the central control system 500 of FIG. 5 may cause the strobe rate of the main output projected light to toggle with the strobe of the LED tracking ring 302. Toggle is explained as the following: When light is being projected from the main output, i.e. from output lens 340, the LED tracking ring 302 is essentially in a dark phase of the strobe cycle. During the dark portion of the strobe cycle of the main output projected light, the strobe portion of the LED tracking ring 302 is in the illumination phase. In this way a strobe toggle is created by toggling light output between the main output projected light from lens 340 and the light from the LED tracking ring 302 in synchronization.

The commands for the color varying of the main output and the LED tracking ring 302 and the strobe commands for the main output and LED tracking ring 302 can also be created by an operator inputting to the stand alone control system 424. The operator may input commands through the input devices 402a, 402b, 402c and 402d. The input commands received by the use of input devices 402a, 402b, 402c and 402d can be sent from the control input system 422 to the processor 416. The processor 416 acting in accordance with the memory 415 can process the commands to control the color varying or strobing of the main output projected light from output lens 340 or the LED tracking ring 302.

The LED tracking ring 302 is shown surrounding the aperture 340a of the output lens 340 and it is preferred to be a ring that surrounds the aperture 340a. The LED tracking ring 302 could take on a different look if desired and may be constructed of a different geometric shape other than a ring. The lamp 308 could also be a comprised of a plurality of LEDs and in this case the lens 340 would not be required. Alternatively, the output lens 340 and aperture 340a may not be located in the center of the LED tracking ring 302.

The red LEDs of the LED tracking ring 302 may be connectively wired so that all red LED components of the LEDs 350a through 350x of the tracking ring 302 are driven simultaneously as described. The blue LEDs of the LED tracking ring 302 may be wired so that all blue LED components of the LEDs 350a through 350x of the tracking ring 302 are driven simultaneously as described. The LEDs of the LED tracking ring 302 may be wired so that all green LED components of the LEDs 350a through 350x of the tracking ring 302 are driven simultaneously as described. Alternatively separate control of each color component of each LED 350a through 350x may be driven by the LED control 442 of FIG. 4.

We claim:

1. A theatrical lighting apparatus comprising
a housing;
a first lamp located within the housing;
a communications port;
a plurality of light emitting diodes forming a [substantially circular] *geometric* array;
wherein the plurality of light emitting diodes emit a first light in response to a first command *received by the communications port*;
wherein a second light from the first lamp is emitted perpendicular to the [substantially circular] *geometric* array of *the plurality of* light emitting diodes;
wherein the second light from the first lamp is emitted from a location which is substantially centrally located with respect to the [substantially circular] *geometric* array; [and]
wherein the first command is compliant with [the] *a* DMX protocol*;*
*wherein the first lamp projects the second light from the housing through a subtractive color system, in response to a second command received by the communications port; and*
*wherein each of the plurality of light emitting diodes projects light from the housing independent of the subtractive color system and in response to the first command.*

2. The theatrical lighting apparatus of claim 1 wherein the first lamp is a metal halide lamp.

3. The theatrical lighting apparatus of claim 1 wherein the first lamp is a mercury lamp.

4. The theatrical lighting apparatus of claim 1 wherein the first lamp is a xenon lamp.

5. The theatrical lighting apparatus of claim 1 wherein the first lamp is a halogen lamp.

6. The theatrical lighting apparatus of claims 1 wherein the second light emitted by the first lamp is remotely color varied using a CMY (cyan, magenta and yellow) color varying system.

7. The theatrical lighting apparatus of [claims] *claim* 1 wherein
the first light emitted *by* the plurality of light emitting diodes is remotely color varied using an RGB (red, green, and blue) color varying system.

8. A theatrical lighting apparatus comprising
a housing;
a first lamp;
a second lamp;
a remotely controlled CMY (cyan, magenta and yellow) *subtractive* color varying system; and
a remotely controlled RGB (red, green, and blue) *additive* color varying system;
wherein the remotely controlled CMY *subtractive* color varying system is responsive to a central controller;
wherein the central controller includes an input device which can be used by an operator to individually adjust a cyan color saturation of a projected light from the first lamp;
wherein the central controller includes an input device which can be used by an operator to individually adjust a magenta color saturation of the projected light from the first lamp;
wherein the central controller includes an input device which can be used by an operator to individually adjust a yellow color saturation of the projected light from the first lamp;
wherein the remotely controlled RGB *additive* color varying system is responsive to the central controller;
wherein the central controller includes an input device which can be used by an operator to individually adjust a red color of a projected light from the second lamp;
wherein the central controller includes an input device which can be used by an operator to individually adjust a green color of the projected light from the second lamp; and
wherein the central controller includes an input device which can be used by an operator to individually adjust a blue color of the projected light from the second lamp.

9. The theatrical lighting apparatus of claim 8 wherein
the CMY *subtractive color varying system* and RGB *additive* color varying [systems] *system* are remotely controlled by the central controller by commands compliant with [the] *a* DMX protocol.

10. The theatrical lighting apparatus of claim 8 wherein
the RGB *additive* color varying system is comprised of a plurality of light emitting diodes, which include a plurality of red, green and blue light emitting diodes and the CMY *subtractive* color varying system is comprised of dichroic color filter media.

11. The theatrical lighting apparatus of claim 10 wherein
a first set of the plurality of red, green and blue light emitting diodes includes a first red light emitting diode, a first green light emitting diode, and a first blue light emitting diode;

and wherein the first set emits light through a single output aperture to create a homogenous color blend.

[12. A theatre lighting apparatus comprising:

a base;

a communications port;

a processor;

a memory;

a lamp housing comprising:

a lamp, a reflector;

a CMY (cyan, magenta and yellow) color varying system; and a polymer fresnel output lens;

wherein the lamp housing is remotely positioned in relation to the base by a motor;

wherein the lamp, the reflector, the CMY (cyan, magenta and yellow) color varying system, and the polymer fresnel output lens cooperate to project a variable colored light; and wherein a first command received by the communications port causes the CMY color varying system to vary the variable colored light into a first color; and wherein the CMY color varying system is responsive to a central controller;

wherein the central controller includes an input device which can be used by an operator to individually adjust a cyan color saturation of a projected light from the lamp;

wherein the central controller includes an input device which can be used by an operator to individually adjust a magenta color saturation of the projected light from the lamp; and wherein the central controller includes an input device which can be used by an operator to individually adjust a yellow color saturation of the projected light from the lamp.]

[13. The theatrical lighting apparatus of claim 12 wherein the first command is compliant with DMX protocol.]

[14. The theatrical lighting apparatus of claim 12 further comprising a gobo wheel for projecting patterns from the polymer fresnel output lens.]

[15. A theatre lighting apparatus comprising:

a base;

a communications port;

a processor;

a memory; and a lamp housing;

the lamp housing comprising;

a lamp, a reflector;

a color varying system;

a polymer output lens; and a gobo wheel;

wherein the lamp housing is remotely positioned in relation to the base by a motor;

wherein the reflector, the color varying system, and the polymer output lens cooperate to project a first variable colored light;

wherein a first command received by the communications port varies the first variable colored light into a first color; and wherein patterns located by a gobo wheel can be projected by the polymer output lens;

wherein the color varying system is responsive to a central controller; and wherein the central controller includes an input device which can be used by an operator to individually adjust a color of projected light from the lamp.]

[16. A theatre lighting apparatus comprising:

a base;

a communications port;

a processor;

a memory;

a lamp housing comprising a lamp, a reflector;

a color varying system;

a polymer output lens; and an optical power varying system;

wherein the lamp housing is remotely positioned in relation to the base by a motor;

wherein the reflector, the color varying system, and the polymer output lens cooperate to project a first variable colored light;

wherein a first command received by the communications port varies the first variable colored light into a first color; and wherein a further light projected by the polymer output lens can be varied from a soft edge to a hard edge by varying the optical power varying system;

wherein the color varying system is responsive to a central controller; and wherein the central controller includes an input device which can be used by an operator to individually adjust a color of projected light from the lamp.]

[17. The theatre lighting apparatus of claim 16 wherein the optical varying system is comprised of two flags.]

* * * * *